Figure 1:
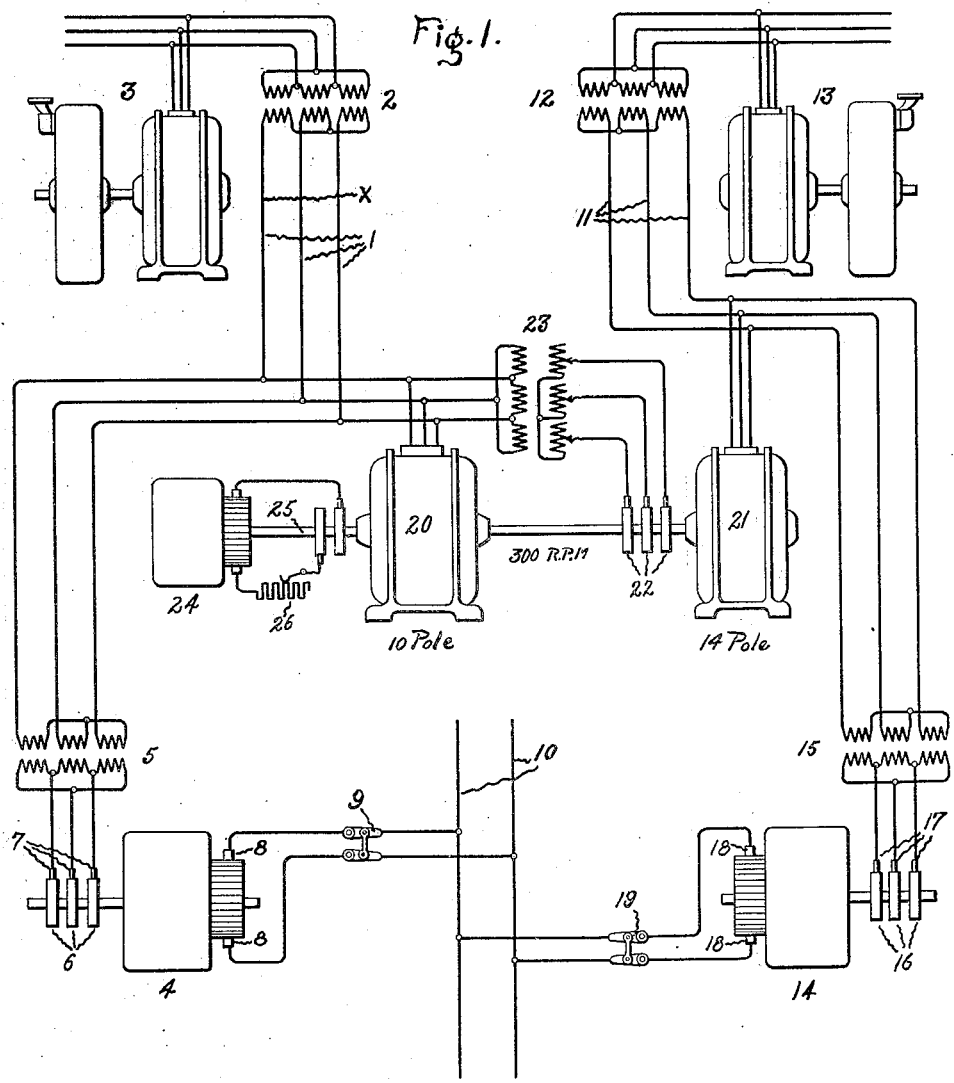

June 7, 1927.

T. F. BARTON 1,631,715

SYSTEM OF DISTRIBUTION

Filed March 30, 1923 2 Sheets-Sheet 1

Inventor:
Theophilus F. Barton,
by *Alexander F. Smith*
His Attorney.

Patented June 7, 1927.

1,631,715

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

SYSTEM OF DISTRIBUTION.

Application filed March 30, 1923. Serial No. 628,886.

My invention relates to systems of distribution, and in particular to a system of distribution which permits a plurality of machines having the characteristics of rotary converters when operated in parallel to be safely connected between a common direct current system and a plurality of alternating current systems of different frequencies.

When two or more rotary converters which are connected in parallel on their direct current ends, are supplied from a suitable source of alternating current, or from different sources, it becomes necessary to maintain substantially the same voltage relation at their alternating current terminals in order to guard against destructive unbalancing of the load between them or to guard against the inverting of a portion of the converters. When the alternating current systems supplying the rotary converters are of the same frequency, the correct voltage relation at the alternating current terminals of the rotary converters may be maintained by connecting corresponding phases of the alternating current terminals together by low resistance bus bars as explained in Patent No. 660,483 to Berg. When, however, it is desired to supply the rotary converters from systems of different frequencies the method proposed by Berg is no longer applicable. Not only must the alternating current terminal voltage of the rotary converters be maintained within the desired relation, but the frequency relation between the different systems supplying these voltages must be maintained substantially fixed because a change in frequency on one system which is not accompanied by a proportionate change in the frequencies of the remaining systems will have a disturbing influence on the voltage relation which it is desired to maintain.

It is the main object of my invention to provide a voltage tie between alternating current systems of different frequency. The systems may then successfully supply such apparatus as rotary converters which are connected in parallel on their direct current ends. Other advantages of my invention will appear as the description proceeds.

The types of frequency converters now in common use will not solve this problem because they provide only a frequency tie between the systems and not a voltage tie such as would be provided by an ordinary transformer if it were possible to connect an ordinary transformer between two different systems. I have discovered that it is possible to provide the desired voltage tie between two systems of different frequency by means of a transformer, one element of which is rotated with respect to the other at the proper speed to compensate for the difference in frequencies on the interconnected systems. One such arrangement may be obtained with the use of a machine constructed according to the theory disclosed in Steinmetz Patent No. 620,990.

The machine therein described comprises a synchronous dynamo electric machine mechanically connected to a dynamo electric machine of the wound secondary induction type. The speed and polar relation of the two machines can be made such that when the synchronous machine as connected to and is running synchronously from one system it drives one member of the induction machine relative to the other member at the correct speed to permit the primary and secondary windings thereof to be connected as a transformer between the two different frequency systems. Such a machine constitutes a frequency and voltage tie between the two systems and, when correctly designed and proportioned with relation to the capacites of the inter-connecting systems, permits rotary converters to be safely operated from said systems to supply a common direct current system.

The features of my invention which I believe to be novel and patentable will be pointed out in the claims appended hereto. Distribution systems illustrative of my invention will now be described in connection with the accompanying drawings, Fig. 1 of which represents a direct current system being supplied through rotary converters from two alternating current systems of different frequencies, said two systems being tied together in the manner to be described, and Fig. 2 shows the application of my invention to the tying together of three alternating current systems of different frequencies which supply, through rotary converters, a common direct current system.

In order to illustrate a practical application of my invention, I will represent the alternating current systems as having certain definite frequencies and frequency converters as having certain definite pole numbers and corresponding definite speed relations, but I desire to have it understood that the invention is by no means limited to the values or relations given as it will be evident to those skilled in the art that various modifications and combinations other than those herein described may be obtained by the further application of my invention.

Figure 2:
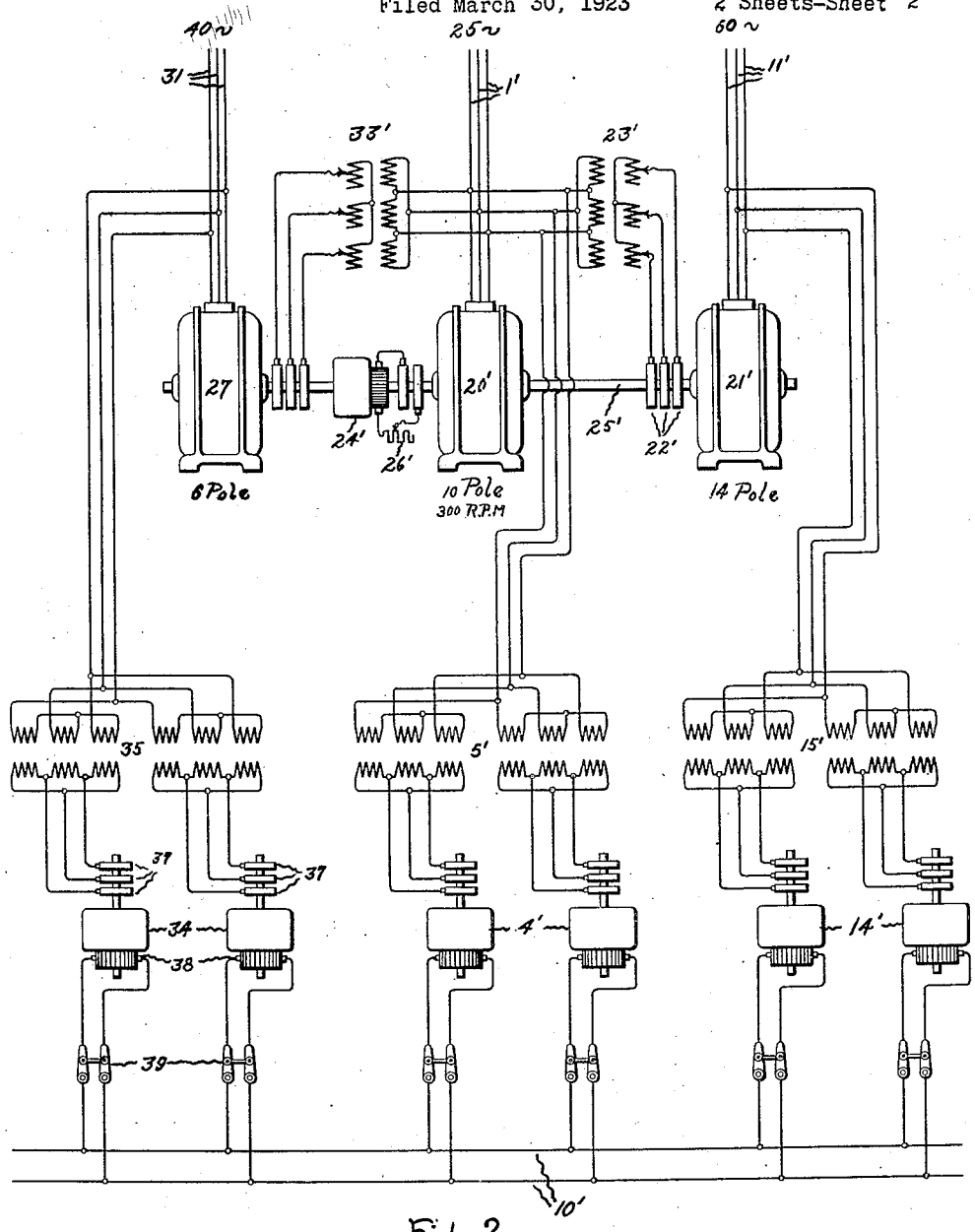

Referring to Fig. 1 of the drawing, 1 represents a 25 cycle alternating current distribution system supplied through a step up transformer 2 from a generating station represented at 3. This distribution system supplies a rotary converter 4 through a step down transformer 5. The secondary of the transformer 5 is represented as being 3 phase and is connected to the A. C. end of the converter 4 by means of the three slip rings 6 and brushes 7. Ordinarily it would probably be preferable to employ a greater number of phases between the transformer 5 and converter 4 but the drawing is only illustrative and three phases are shown for the sake of simplicity. The direct current end of the converter 4 supplies, through brushes 8 and line switch 9, a direct current main represented at 10. Similarly 11 represents a 60 cycle distribution system supplied through a step up transformer 12 from a generating station represented at 13. The 60 cycle system supplies a rotary converter 14 through a step down transformer 15, slip rings 16 and brushes 17. The direct current end of converter 14 is connected, through brushes 18 and line switch 19, to the common direct current main 10.

It is known that the amount and direction of power flow through a synchronous converter equipment where a number of such machines are operating in parallel depends on the voltage difference at the A. C. and D. C. bus bars. In order to obtain successful parallel operation with the converters 4 and 14, it is therefore necessary that their A. C. voltage relation at 7 and 17 be maintained substantially constant since the D. C. voltage is necessarily equal because of the bus bar connection. Otherwise the converter connected to the A. C. system having the lower voltage relation would operate as an inverted converter and power would be transferred through the converters from the A. C. system having the higher voltage relation to the A. C. system having the lower voltage relation. Furthermore, it is evident that under these conditions the converter between the A. C. system having the higher voltage relation and the D. C. system would be overloaded since it would have to carry the load which the inverted converter was carrying before the disturbance occurred and also would have to transform the power supplied to the A. C. system having the lower voltage relation. If it were possible to connect the two A. C. systems together by bus bars, this trouble would not occur because any disturbance that would produce a change in the voltage of one A. C. system would also produce a similar change in the voltage of the other A. C. system and there would be no danger of either of the converters inverting. A direct connection between the two A. C. systems, however, cannot be made because of the difference in their frequencies.

It will be noted that throughout this specification the expression "voltage relation" has been used when referring to the A. C. voltages of the different systems. This expression is used because it is entirely possible that the rotary converters may have different numbers of phases and if so the ratio of their A. C. and D. C. voltages would be different. For example, if all the rotary converters are six phase or all three phase the A. C. voltages must be maintained substantially the same, but if some are three phase and some six phase, the A. C. voltages must be maintained at substantially the correct voltage relation to make the D. C. voltages equal. It is also possible and likely that the voltage of the two systems 1 and 11 will be different, the difference being taken care of by the difference in ratios of the transformers 5 and 15. The expression "voltage relation" is used since it is applicable to all conditions.

I have discovered that the desired voltage relation at the A. C. terminals of the converters 4 and 14 can be maintained by a machine comprising, in this instance, a 10 pole synchronous machine 20 having its A. C. terminals connected to the 25 cycle system 1 and having its rotating element mechanically connected to the rotating member of a 14 pole induction machine 21 of the wound rotor type. One winding of the machine 21, in this instance the stationary winding, is electrically connected to the 60 cycle system 11 and the other winding is connected, through slip rings 22 and transformer 23, to the 25 cycle system 1. The field of the synchronous machine 20 is illustrated as being supplied by an exciter 24 mounted on the same shaft 25 with the rotary members of the frequency converter.

With this combination it will be apparent that the synchronous speed of machine 20 is 300 R. P. M. and that at this speed the slip frequency of the induction machine 21 will be 25 cycles, that is to say the generated frequency across its slip rings 22 when rotating at 300 R. P. M. and with its stationary winding excited at 60 cycles will be 25 cycles. The slip rings may, therefore, be connected to the 25 cycle system 1 through a stationary transformer 23 to take care of any difference in the voltages. Theoretically the ratio of transformation between the primary and secondary of the machine 21 may be made such that the slip rings 22 may be directly connected to line 1. However, in order that the induction machine may be efficiently designed, it is necessary to make its secondary voltage considerably lower than the practical voltage of the A. C. systems and then use a transformer at 23 as illustrated. The transformer 23 is designed with low reactance and is made adjustable in order that the exciting current for the induction machine may be drawn from either of the A. C. systems as desired.

The induction machine 21 acts as a transformer between the alternating current systems so that any disturbance on either system affects the other system, whereby the desired voltage relation between the systems is maintained. For example, if a disturbance occurs on one system which tends to lower the voltage thereof, energy is transferred by the frequency converter from the system having the higher voltage relation to the system having the lower voltage relation until sufficient current is drawn from the system having the higher voltage relation to lower its voltage and raise the voltage of the other system until the desired relation is again established. In this way the frequency converter acts as a voltage tie between the two systems. Consequently there is no danger of any of the converters inverting due to an unbalanced voltage relation between the two systems. The frequency converter also maintains a frequency tie between the two systems due to its function as a fixed ratio frequency converter.

In order that the frequency converter may successfully perform the principal function assigned to it, namely; to maintain a definite relation at the alternating current ends of the rotary converters, it is essential that the frequency converter be of sufficient capacity and of a suitable design to substantially instantaneously transfer sufficient reactive k. v. a. from one alternating current system to the other, in either direction, to maintain the desired voltage balance under any condition of disturbance liable to be met with. The capacity will, of course, depend upon the capacities and the voltage regulation of the two alternating current systems and the amount of rotary converter load.

Perhaps the worst condition of unbalance liable to be met with is where a short circuit occurs on one of the A. C. systems between the generating station and the frequency changer, which, of course, will be situated as near to the rotary converter loads as is practicable. For example, suppose the system is in normal operation and a complete short circuit occurs on the 25 cycle system at X. Under these conditions if it were not for the voltage tie near the rotary converters, converter 4 would immediately invert and feed the short circuit. Both converters 4 and 14 would then be greatly overloaded and would either destroy themselves or interrupt the supply of the D. C. system 10 or do both. The voltage tie between the A. C. systems prevents this by transferring sufficient energy from system 11 to system 1 to maintain the desired voltage relation. The voltage impressed on transformer 15 will be greatly reduced due to the heavy load which system 11 is, under these conditions, supplying to system 1 and the voltage at transformer 5 will be kept up to a value corresponding to the desired voltage relation. The short circuit will burn itself out or otherwise clear itself such as by the opening of automatic circuit breakers which may be provided between the A. C. transmission lines and the frequency changer. In order that this transfer of energy between the two systems may take place before the rotary converter 4 inverts it is highly desirable that the frequency changer be designed with comparatively low reactance. The frequency changer will, of course, transfer reactive k. v. a. in either direction depending upon which of the A. C. systems has the higher voltage relation.

To sum up, in the proposed system the frequency converter is designed with sufficiently low reactance and large capacity to permit sufficiently large exchanges of reactive k. v. a. between the two systems that the voltage relation on the A. C. buses will not become sufficiently unbalanced to cause trouble should a short circuit occur on one of the systems.

The proposed tie between the A. C. systems has certain advantages regardless of the use of rotary converters. The frequency changer also acts as a frequency and load stabilizer for the two A. C. systems because it is of sufficient capacity to transfer energy from one system to the other in amounts sufficient to balance up the loads between them and, therefore, maintain their frequencies in the desired fixed relation, it being assumed that the speed regulating equipment of the prime movers at 3 and 13 is, as usual, adjusted so that the speed will drop slightly with an increase in load. The synchronous machine 20 may also be utilized to improve the power factor of both systems by the proper adjustment of its field rheostat 26 and the ratio of the transformer 23.

In Fig. 2 I have represented the application of my invention as used for purpose of tying together three alternating current systems of different frequencies which supply rotary converters connected to the same direct current system. In this figure the two right hand A. C. systems 1' and 11', the frequency converter composed of synchronous machine 20' and induction machine 21' together with the transformers 5' and 15' and rotary converters 4' and 14' are exactly similar to the system described in Fig. 1 with the exception that two transformers and two rotary converters are shown connected between each A. C. system and the D. C. system 10' instead of one. It will, therefore, not be necessary to explain this portion of Fig. 2 in detail.

A third A. C. system 31, which for the purpose of illustration is taken as a 40 cycle system, is shown supplying rotary converters 34, through slip rings 37 and transformers 35. The converters 34 are shown connected through their D. C. brushes 38 and line switches 39, to the same direct current systems 10' as the other converters which are fed from the 25 and 60 cycle system. Now in order to maintain a voltage tie between the 40 cycle system and the other two A. C. systems I mechanically connect the rotary element of a second form wound induction machine 27 to the rotary members of machines 20' and 21' in such speed relation that for a given pole number the two windings of machine 27 may act as a rotary transformer between the 40 cycle system and one of the other A. C. systems. As represented, the rotary elements of the three machines are all mounted on the same shaft 25' which, for a 6 pole winding on machine 27, permits its secondary winding to be connected, preferably through an adjustable transformer 33; to the 25 cycle system 1, and through the rotary transformer 21' and preferably the stationary adjustable transformer 23' to the 60 cycle system 11'. If the secondary windings of the two induction machines are designed for the same voltage, it will be permissible to connect them by a direct electrical connection, in which case only one set of slip rings and one adjustable transformer need be used to connect these windings to the 25 cycle system. Such a set will run at 300 R. P. M.

A voltage tie is, therefore, established between the three A. C. systems which will maintain the desired voltage relation at the A. C. terminals of all of the rotary converters so that they may safely supply the same D. C. system 10'. A short circuit or voltage disturbance on any one of the A. C. systems will be taken care of by a corresponding reactive k. v. a. transfer from or to the other two A. C. systems in a manner explained in connection with Fig. 1 except that in Fig. 2 the transferred load would ordinarily be distributed between two systems.

From the examples given it will be apparent that any desired number of alternating current systems of the same or different frequencies may be tied together in accordance with my invention. It is, of course, not necessary that the rotary elements of the frequency changer be all mounted on the same shaft as they may be geared or otherwise mechanically connected together so as to obtain the correct relation between frequency, pole number and speed. Part or all of the frequency changer elements may be connected to the A. C. systems on the rotary converter side of the step down transformers or in certain cases the step down transformers may be omitted altogether. The particular arrangement and combination to be selected in any given case will depend upon the frequencies and voltages of the A. C. systems which are to be tied together. It will, of course, be evident that provision may be made so that any one or more of the rotary converters represented in Fig. 2 may be disconnected and shut down without interfering with the remainder of the system and that if desired one of the induction machines of the frequency changer set shown in Fig. 2 may likewise be electrically and mechanically disconnected from the remaining elements and its corresponding A. C. system if the D. C. load falls off sufficiently to permit the rotary converters connected to that system to be shut down.

The invention has been described as a means for maintaining a voltage tie between alternating current systems of different frequencies when supplying rotary converters connected in parallel on their D. C. ends. The invention is equally applicable for maintaining a voltage and frequency tie between the systems for any other purpose.

In accordance with the patent statutes I have described the principle of operation of my invention and certain specific modifications thereof which I now believe to represent the best arrangement under the conditions assumed, but I desire to have it understood that these modifications are only illustrative and that the invention may be otherwise carried out. I, therefore, do not wish to be limited to the particular modifications herein shown and described but seek to cover in the appended claims all modifications which come fairly within the true spirit and scope of my invention.

What I claim as new and desire to secure by Letters Patent of the United States, is:

1. An electric distribution system comprising a plurality of alternating current systems of different frequencies, rotary converters connected between said systems and a common direct current system, and means for maintaining a voltage and frequency tie between said alternating current systems, comprising an electro-dynamic transformer of large capacity with respect to the capacities of the interconnected systems and of sufficiently low reactance to permit substantially instantaneous interchanges of reactive k. v. a. between said systems in amounts sufficient to maintain the voltage relation between said systems substantially fixed.

2. In an electric distribution system means for maintaining a frequency and voltage tie between the high tension alternating current systems of different frequencies comprising a synchronous dynamo electric machine connected to one of said systems a low reactance, induction dynamo electric machine of the wound secondary type, having its primary windings connected to the other of said systems, the rotary elements of said machines being mechanically connected together in such a speed relation that the secondary frequency of said induction machine is equal to the frequency of the system to which the synchronous machine is connected and a transformer connected between said secondary winding and the system to which the synchronous machine is connected, said induction dynamo electric machine serving as a substantially constant voltage ratio transformer at all loads.

3. In an electric distribution system, means for maintaining a frequency and voltage tie between two alternating current systems of different frequencies as claimed in claim 2, characterized by the feature that the ratio of said transformer is adjustable, whereby the exciting current for the induction machine may be drawn from either system as desired.

4. In an electric distribution system two alternating current systems of different frequencies supplied from separate sources, a synchronous dynamo electric machine connected to one of said systems, an induction machine of the wound secondary type connected to the other of said systems, the rotary elements of said machines being mechanically connected together in such speed relation that with the synchronous machine running synchronously, the secondary frequency of said induction machine is equal to the frequency of the system in which the synchronous machine is connected, and an electric power connection between said secondary winding and the system connected to said synchronous machine, the inductive connection thus formed between the two systems being proportioned and designed to transmit a variable k. v. a. load at a substantially constant voltage ratio in amounts sufficient to maintain a substantially fixed voltage relation between said system up to the maximum k. v. a. capacity of either system.

In witness whereof, I have hereunto set my hand this 29th day of March, 1923.

THEOPHILUS F. BARTON.